United States Patent [19]

Chen

[11] Patent Number: 5,402,178

[45] Date of Patent: Mar. 28, 1995

[54] APPARATUS FOR EXTRACTING A SIGNAL WITHOUT EXTERNAL POWER SUPPLY

[75] Inventor: Shyi-Hon Chen, Taipei,

[73] Assignee: Acer Peripherals, Inc., Taiwan, Prov. of China

[21] Appl. No.: 97,453

[22] Filed: Jul. 26, 1993

[51] Int. Cl.⁶ .............................................. H04N 5/04
[52] U.S. Cl. .................................. 348/529; 348/525; 348/730; 327/98
[58] Field of Search ................ 358/86, 148, 158, 153, 358/154, 190; 348/529, 530, 500, 525, 532, 730; H04N 5/04, 5/08, 5/10, 5/63; 307/231, 510, 518, 527, 350, 519; 328/139, 138, 137

[56] References Cited

FOREIGN PATENT DOCUMENTS

| | | | |
|---|---|---|---|
| 2735413 | 2/1979 | Germany | 358/148 |
| 0159187 | 10/1982 | Japan | 358/190 |
| 0100036 | 5/1987 | Japan | 358/86 |

Primary Examiner—James J. Groody
Assistant Examiner—David E. Harvey
Attorney, Agent, or Firm—Townsend and Townsend Khourie and Crew

[57] ABSTRACT

Apparatus for extracting a target signal from a composite signal. The apparatus makes use of the composite signal to generate a DC power supply, whereupon no external power supply is needed for the apparatus to operate.

7 Claims, 3 Drawing Sheets

APPARATUS FOR EXTRACTING A SIGNAL WITHOUT EXTERNAL POWER SUPPLY

BACKGROUND OF THE INVENTION

The present invention relates generally to apparatus for extracting a target signal from a composite signal having the target signal and other signals combined together, and more particularly to a signal extracting apparatus which does not need to have an external power supply and which keeps the composite signal as intact as possible.

In electronic circuit applications, multiple signals are sometimes combined into a single composite signal to save cost of equipment (such as coaxial cables) in a signal transmission procedure. The need then arises to separate a target signal from the composite signal in order to further process the target signal, and a signal extracting apparatus must be used. For example, in a display monitor control circuit with only one cable input that represents both the horizontal synchronization (H-sync) and vertical synchronization (V-sync) signals, a signal extracting apparatus is necessary to separate the two signals for operation of the control circuit.

FIG. 1 shows a prior art circuit for extracting a target signal from a composite signal. Signal 111 is a composite signal ((H+V)-sync) of a horizontal synchronization signal (H-sync) and a vertical synchronization signal (V-sync) of a display monitor. Referring to the timing diagram of FIG. 2, signal 211 and signal 212 are the original H-sync and V-sync signals, respectively. Exclusive-OR gate G1 has signal 111 as one input and the other input kept "0". Thus the output signal 112 basically follows signal 111 except that signal 112 has the voltage level of TTL logic and possesses stronger driving capability. Furthermore, G1 separates signal 111 from the resistors and capacitor on the right hand side of the circuit with a high input impedance so that it won't be distorted by the charging and discharging effect.

A low-pass filter consisting of resistors R11 and R12 and capacitor C11 then passes only the low frequency portion of signal 112 and results in signal 113 which is the envelope of the low-frequency signal in the composite signal 111. Signal 113 has the shape of the vertical synchronization signal 212. With resistive and capacitive load of R11, R12, and C11, the rise time and fall time of signal 113 are longer and the amplitude is smaller than signal 112. Therefore another Exclusive-OR gate G2 is inserted between signal 113 and the ultimate output of this signal extracting circuit to recover signal 212 from the distorted signal 113. The other input terminal of G2 is kept "0" as in the case of G1. This makes the output signal 114 have TTL logic voltage levels and rise time and fall time closer to those of signal 212. Gates G1 and G2 can be replaced by OR gates, but whatever logic gates are used, the circuit requires a separate 5-volt power supply.

SUMMARY OF THE INVENTION

The present invention provides apparatus for extracting a target signal from a composite signal with minimal distortion of the composite signal and without the need for an external power supply.

In brief, apparatus according to the present invention includes a low pass filter which filters the composite signal, an amplifier for amplifying the filtered signal, and a DC voltage circuit that receives the composite signal and provides a DC power supply for the amplifier. The apparatus preferably further includes an output stage.

A further understanding of the nature and advantage of the present invention may be realized by reference to the remaining description and the attached drawings.

DESCRIPTION OF SPECIFIC EMBODIMENTS

Figure 3:
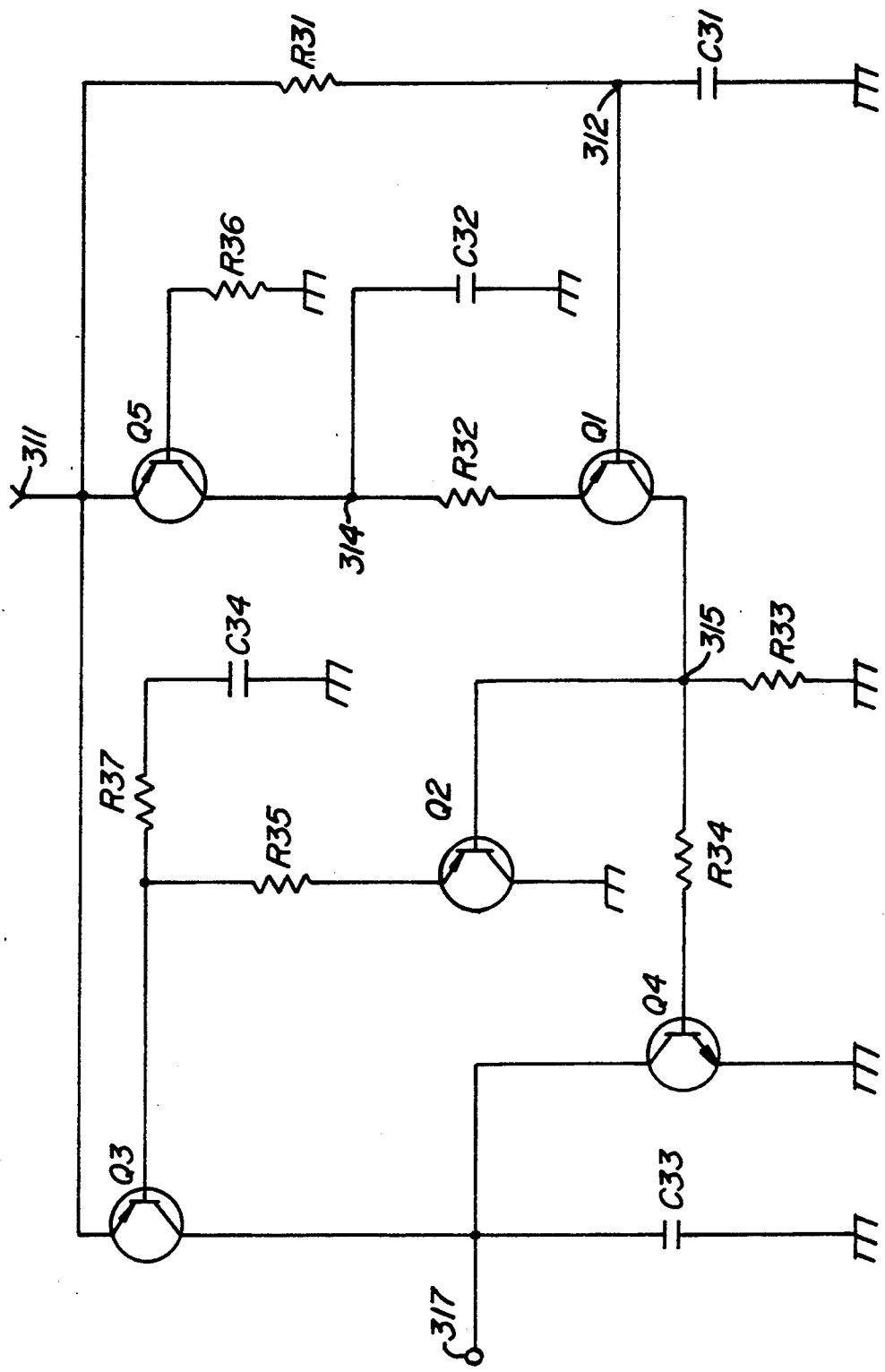
FIG. 3 shows a preferred embodiment of a signal extracting circuit according to the present invention.
Figure 4:
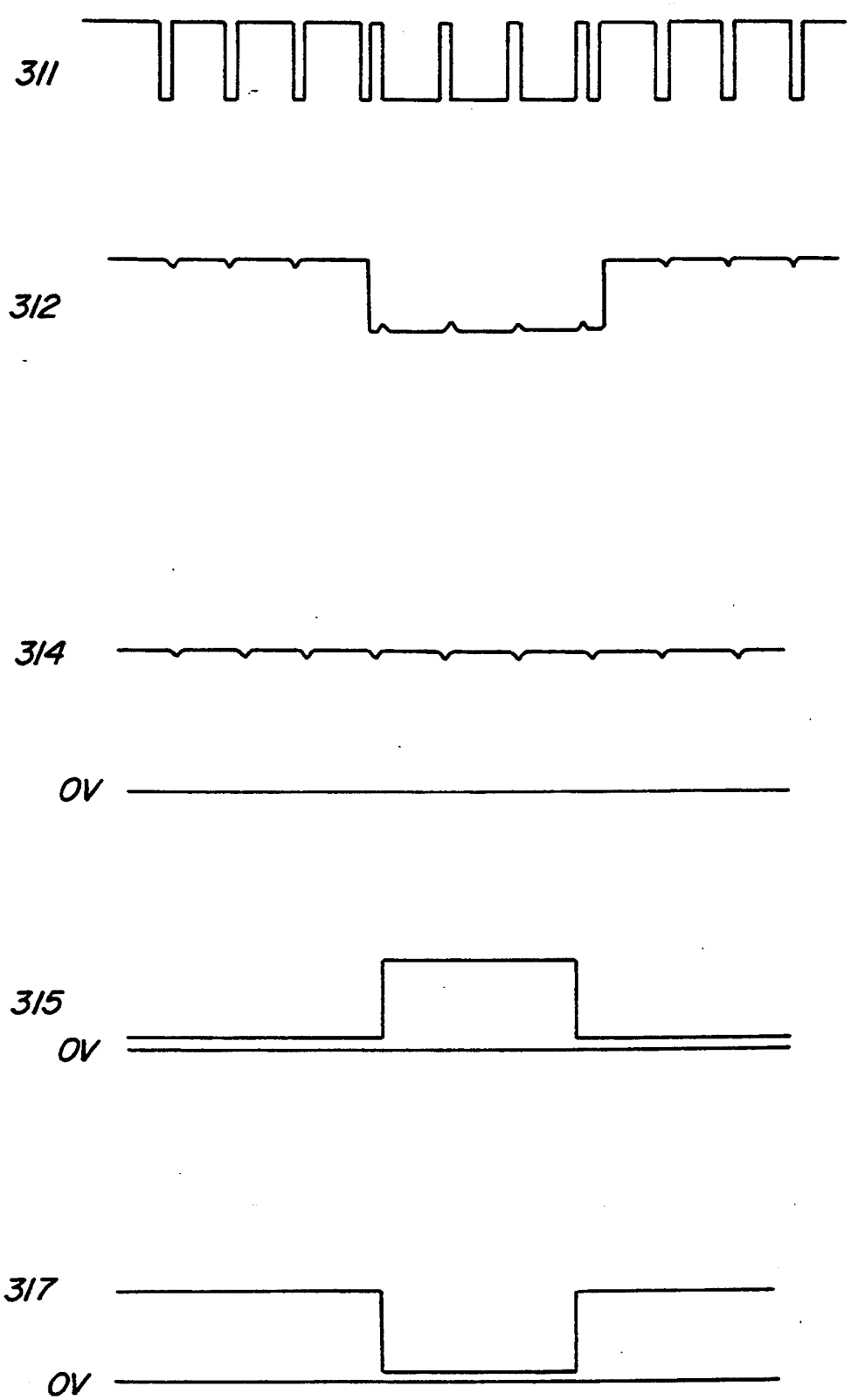
FIG. 4 is the timing diagram of the preferred embodiment in FIG. 3.

FIG. 3 is a circuit schematic of a preferred embodiment of the present invention for extracting a vertical synchronization signal from a composite signal. In the timing diagram of FIG. 4, signal 311 is same as signal 111; both represent the composite signal ((H+V)-sync) of H-sync and V-sync signal. A high-value resistor R31 and a capacitor C31 form a low-pass filter. Signal 311 passes through the low-pass filter and results in signal 312, which is the "envelope" of the lower frequency signal (the vertical synchronization signal 212) as shown in FIG. 4.

A PNP bipolar transistor Q5 along with a resistor R36 and a capacitor C32 filter out the high frequency portion of signal 311 and produce a DC signal 314. In other words, the emitter of Q5 receives signal 311 and Q5 turns on when signal 311 is high and charges C32. C32 then holds the voltage level and thus provides a DC voltage as the power supply for PNP bipolar transistor Q1. Resistor R36 is coupled to both the base of Q5 and ground (0 volt) to limit the current passing through the emitter and collector of Q5. This arrangement minimizes the distortion of signal 311.

Q1 receives signal 312 at its base and inverts and amplifies it to generate signal 315 at its collector. Signal 315 is then sent to the base of a PNP bipolar transistor Q2, which functions as an emitter follower in this circuit, to enhance the driving ability of signal 315.

Figure 1:
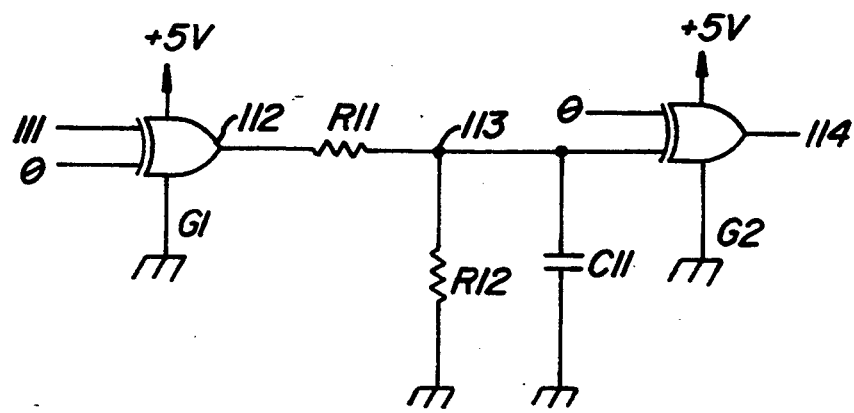
FIG. 1 shows a prior art signal extracting circuit.
Figure 2:
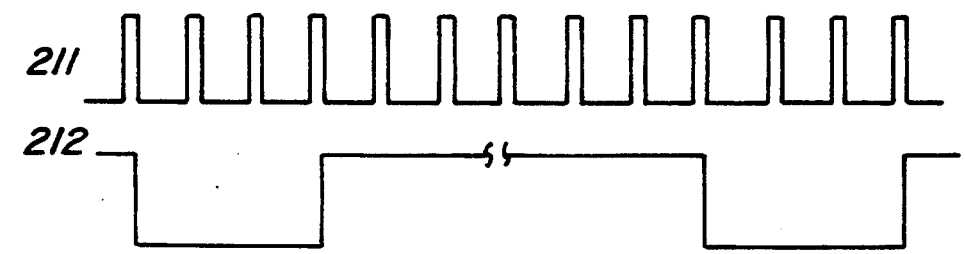
FIG. 2 is the timing diagram of the prior art circuit in FIG. 1.
Figure 2:
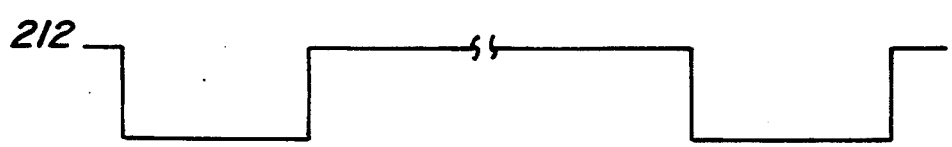
Figure 2:
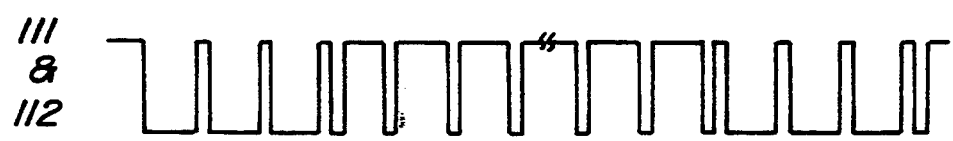
Figure 2:
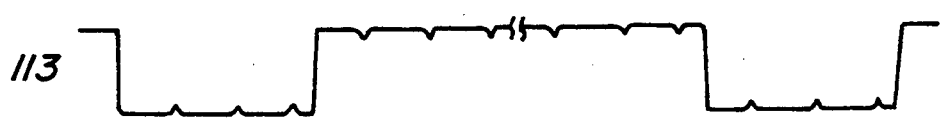
Figure 2:

An output stage that includes a PNP bipolar transistor Q3 and an NPN bipolar transistor Q4 is placed before the output signal 317. When signal 315 is low, Q2 and Q3 both conduct, whereupon a current flows through the emitter and collector of Q3 from signal 311 to charge up capacitor C33. At this period, Q4 turns off and Q3 saturates; consequently C33 can be charged to and holds almost the same voltage level as the peak of signal 311. When signal 315 rises to high, both Q2 and Q3 turn off and Q4 is on, and the charge in C33 goes through the collector and emitter of Q4 to ground. Because Q4 is designed to saturate at this time period, the voltage of C33, i.e., signal 317, drops to near zero volts. Signal 315 stays high for some time and falls to low again, thus producing an output signal 317 with a reversed pulse similar to that of signal 212 (in FIG. 2). The combination of Q3 and Q4 can be best described as a "dynamic impedance matching circuit." The base of Q3 is further connected to a delay circuit including resistor R37 and capacitor C34, to extend the turn-on time of Q3 so that the current passing through stays low. Resistors R32, R34, and R35 are for biasing purposes.

In the present invention, no external power supply is needed as long as the amplitude of signal 311 (the (H+V)-sync signal) is greater than a certain value (in this case, about the voltage drop of two p-n junction diodes, i.e. around 1.4 volts). Furthermore, all the terminals connected to signal 311 have high input impedance to lessen the possible distortion of signal 311. Meanwhile, with the dynamic impedance matching output stage, the extracted target signal (the vertical synchronization signal) can be relatively close to a real square wave.

While the above description provides a full and complete description of the preferred embodiment of the present invention, various modifications, alternate constructions, and equivalents may be employed while still remaining within the scope of the invention. For example, the bipolar transistors in the preferred embodiment could be replaced by other similar devices, together with some minor modifications of associated circuitry and still achieve the function of the invention. Therefore, the above description and illustrations should not be construed as limiting the scope of the invention which is defined by the following claims.

What is claimed is:

1. Apparatus for extracting a target signal from a composite signal, the composite signal having the target signal and a second signal component with distinct frequencies respectively, the apparatus comprising:

filter means, having a first input terminal that receives the composite signal, for filtering out the second signal component and generating an envelope signal of the target signal;

DC voltage generating means, having a second input terminal that receives the composite signal, for generating a DC voltage signal;

amplifier means, powered by the DC voltage signal and having a third input terminal that receives the envelope signal, for generating an amplified signal; and output means, having a fourth input terminal that receives the amplified signal and a fifth input terminal that receives the composite signal, for outputting the target signal at an output terminal, the output means having a high input impedance when looking into the fifth input terminal and a low output impedance at the output terminal.

2. The apparatus of claim 1, wherein said output means comprises a PNP bipolar transistor, a capacitor and an NPN bipolar transistor, the PNP bipolar transistor having an emitter terminal coupled to the fifth input terminal, and a collector terminal, the NPN bipolar transistor having a collector terminal being coupled to the collector terminal of the PNP bipolar transistor and the capacitor to form the output terminal of the output means, and a base terminal coupled to the fourth input terminal for receiving the amplified signal.

3. Apparatus for extracting a target signal from a composite signal having at least first and second signal components, the target signal being analogous to one of the first and second signal components, the apparatus comprising:

filter means having a first input terminal, said filter means receiving the composite signal through the first input terminal for generating a filtered signal;

DC voltage generating means receiving the composite signal for generating a DC voltage signal;

a first bipolar transistor having a first base, a first collector, and a first emitter, said first bipolar transistor for amplifying the filtered signal, the first base receiving the filtered signal, the first emitter receiving the DC voltage signal; and output means having a second bipolar transistor and a third bipolar transistor, the second bipolar transistor having a second base, a second collector, and a second emitter, the third bipolar transistor having a third base, third collector, and a third emitter, the second base coupled to the third base and the first collector, the second emitter receiving the composite signal, the second collector coupled to the third collector, the third emitter coupled to ground;

whereby the target signal can be generated on the third collector.

4. The apparatus of claim 1 or 3, wherein the filter means comprises a resistor and a capacitor.

5. The apparatus of claim 1 or 3, wherein the target signal is a v-sync signal for a display monitor and the second signal component is a h-sync signal for the display monitor.

6. The apparatus composite signal according to claim 1 or 3, wherein the composite signal has an amplitude greater than 1.4 volts.

7. The apparatus of claim 3, wherein the second bipolar transistor is a PNP bipolar transistor and the third bipolar transistor is an NPN bipolar transistor.

* * * * *